(12) United States Patent
Tsuchida et al.

(10) Patent No.: US 12,631,247 B2
(45) Date of Patent: May 19, 2026

(54) POWER TRANSMISSION DEVICE AND HYDRAULIC DEVICE

(71) Applicants: JATCO Ltd, Fuji City (JP); NISSAN MOTOR CO., LTD., Yokohama (JP)

(72) Inventors: Akira Tsuchida, Sagamihara (JP); Katsunori Yamashita, Chigasaki (JP); Tomoya Otaki, Isehara (JP); Tsutomu Itou, Fujinomiya (JP)

(73) Assignees: JATCO Ltd, Fuji City (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/848,671

(22) PCT Filed: Mar. 23, 2023

(86) PCT No.: PCT/JP2023/011611
§ 371 (c)(1),
(2) Date: Sep. 19, 2024

(87) PCT Pub. No.: WO2023/182448
PCT Pub. Date: Sep. 28, 2023

(65) Prior Publication Data
US 2025/0067333 A1 Feb. 27, 2025

(30) Foreign Application Priority Data
Mar. 23, 2022 (JP) ................................. 2022-047607

(51) Int. Cl.
F16H 57/04 (2010.01)
F16H 57/021 (2012.01)
F16H 57/02 (2012.01)

(52) U.S. Cl.
CPC ....... *F16H 57/0404* (2013.01); *F16H 57/021* (2013.01); *F16H 57/0436* (2013.01); *F16H 2057/02043* (2013.01)

(58) Field of Classification Search
CPC ............. F16H 57/0404; F16H 57/0402; F16H 57/0441; F01M 2011/007
See application file for complete search history.

(56) References Cited

U.S. PATENT DOCUMENTS 2,225,205 A * 12/1940 Brooks ................... B03C 1/286
335/305
3,463,729 A * 8/1969 Bean ........................ B03C 1/28
210/695

(Continued)

FOREIGN PATENT DOCUMENTS

JP 2007315519 A * 12/2007 ............. F16H 63/30
JP 2008280910 A * 11/2008

(Continued)

*Primary Examiner* — Michael A Riegelman
(74) *Attorney, Agent, or Firm* — Foley & Lardner LLP

(57) ABSTRACT

A power transmission device includes: a case that accommodates a power transmission mechanism; a strainer disposed to face a bottom wall portion in the case; a suction port for oil provided in a portion of the strainer facing the bottom wall portion; and a magnet disposed between the bottom wall portion and the strainer in the case. The magnet and the suction port are provided to be displaced from each other when viewed from a facing direction in which the strainer and the bottom wall portion face each other, and the suction port is provided with an opening facing a magnet side.

9 Claims, 9 Drawing Sheets

(56) References Cited

U.S. PATENT DOCUMENTS

| | | | | |
|---|---|---|---|---|
| 4,995,971 | A * | 2/1991 | Droste | B03C 1/286 |
| | | | | 184/6.24 |
| 5,971,719 | A * | 10/1999 | Takeuchi | F16H 61/0025 |
| | | | | 417/307 |
| 5,975,041 | A * | 11/1999 | Narita | F01M 1/12 |
| | | | | 123/196 R |
| 8,157,105 | B2 * | 4/2012 | Nishiyama | F16H 57/0404 |
| | | | | 210/435 |
| 8,292,036 | B2 * | 10/2012 | Nishida | F16H 57/0402 |
| | | | | 184/6.24 |
| 9,353,851 | B2 * | 5/2016 | Kubota | F16H 57/0404 |
| 10,113,458 | B2 * | 10/2018 | Takatsugi | B01D 35/005 |
| 10,174,829 | B2 * | 1/2019 | Abe | B03C 1/286 |
| 10,900,556 | B2 * | 1/2021 | Kato | F16H 57/0441 |
| 12,228,202 | B1 * | 2/2025 | Claywell | F16H 57/0452 |
| 12,429,127 | B2 * | 9/2025 | Spengler | F16H 57/0452 |
| 2002/0095763 | A1 * | 7/2002 | Willis | B01D 35/027 |
| | | | | 210/232 |

| | | | | |
|---|---|---|---|---|
| 2002/0096221 | A1 * | 7/2002 | Kapcoe | F16H 57/0404 |
| | | | | 137/590 |
| 2005/0098508 | A1 * | 5/2005 | Caldwell | B01D 29/56 |
| | | | | 210/455 |
| 2006/0070943 | A1 * | 4/2006 | Nishiyama | F16H 57/0404 |
| | | | | 210/435 |
| 2019/0063590 | A1 * | 2/2019 | Pydin | B60K 7/0015 |
| 2025/0067333 | A1 * | 2/2025 | Tsuchida | F16H 57/0436 |
| 2025/0207660 | A1 * | 6/2025 | Yamashita | F16H 57/0423 |
| 2025/0207661 | A1 * | 6/2025 | Yamashita | F16H 57/0424 |
| 2025/0215968 | A1 * | 7/2025 | Yamashita | F16H 57/0404 |
| 2025/0224029 | A1 * | 7/2025 | Yamashita | F16H 57/0435 |
| 2025/0224032 | A1 * | 7/2025 | Kouya | F16H 61/0006 |

FOREIGN PATENT DOCUMENTS

| | | | | |
|---|---|---|---|---|
| JP | 2011208779 | A | * | 10/2011 |
| JP | 2016161028 | A | * | 9/2016 |

* cited by examiner

VEHICLE WIDTH DIRECTION

FRONT ← → REAR

VEHICLE FRONT-REAR DIRECTION

EOP

UPPER SIDE

VEHICLE FRONT-REAR
DIRECTION

FRONT ← → REAR

VERTICAL LINE VL
DIRECTION

LOWER SIDE

POWER TRANSMISSION DEVICE AND HYDRAULIC DEVICE

TECHNICAL FIELD

The present invention relates to a power transmission device and a hydraulic device.

BACKGROUND ART

Patent Document 1 discloses a hydraulic control device in which a magnet is provided on a surface of a strainer facing an oil pan to trap foreign matter contained in oil in the oil pan.

PRIOR ART DOCUMENT

Patent Document

Patent Document 1: JP 2011-208779 A.

Summary of Invention

The oil in the oil pan is sucked to an oil pump side via the strainer. A filter for removing foreign matter contained in the oil is provided inside the strainer. An amount of foreign matter contained in the oil flowing into the strainer is more preferably small.

A power transmission device according to an aspect of the present invention includes:
  a case configured to accommodate a power transmission mechanism;
  a strainer disposed to face a bottom wall portion in the case;
  a suction port for oil provided in a portion of the strainer facing the bottom wall portion; and
  a magnet disposed between the bottom wall portion and the strainer in the case, in which
  the magnet and the suction port are provided to be displaced from each other when viewed from a facing direction in which the strainer and the bottom wall portion face each other, and
  the suction port is provided with an opening facing a magnet side.

A hydraulic device according to another aspect of the present invention includes:
  a strainer disposed to face a bottom wall portion in a case;
  a magnet disposed between the bottom wall portion and the strainer in the case; and
  an oil pump configured to suck oil stored in a lower portion of the case via the strainer, in which
  the strainer includes a suction port for oil at a portion facing the bottom wall portion, and
  the suction port is provided with an opening facing a magnet side.

According to an aspect of the present invention, an amount of foreign matter contained in oil flowing into a strainer can be reduced.

DESCRIPTION OF EMBODIMENTS

Figure 1:
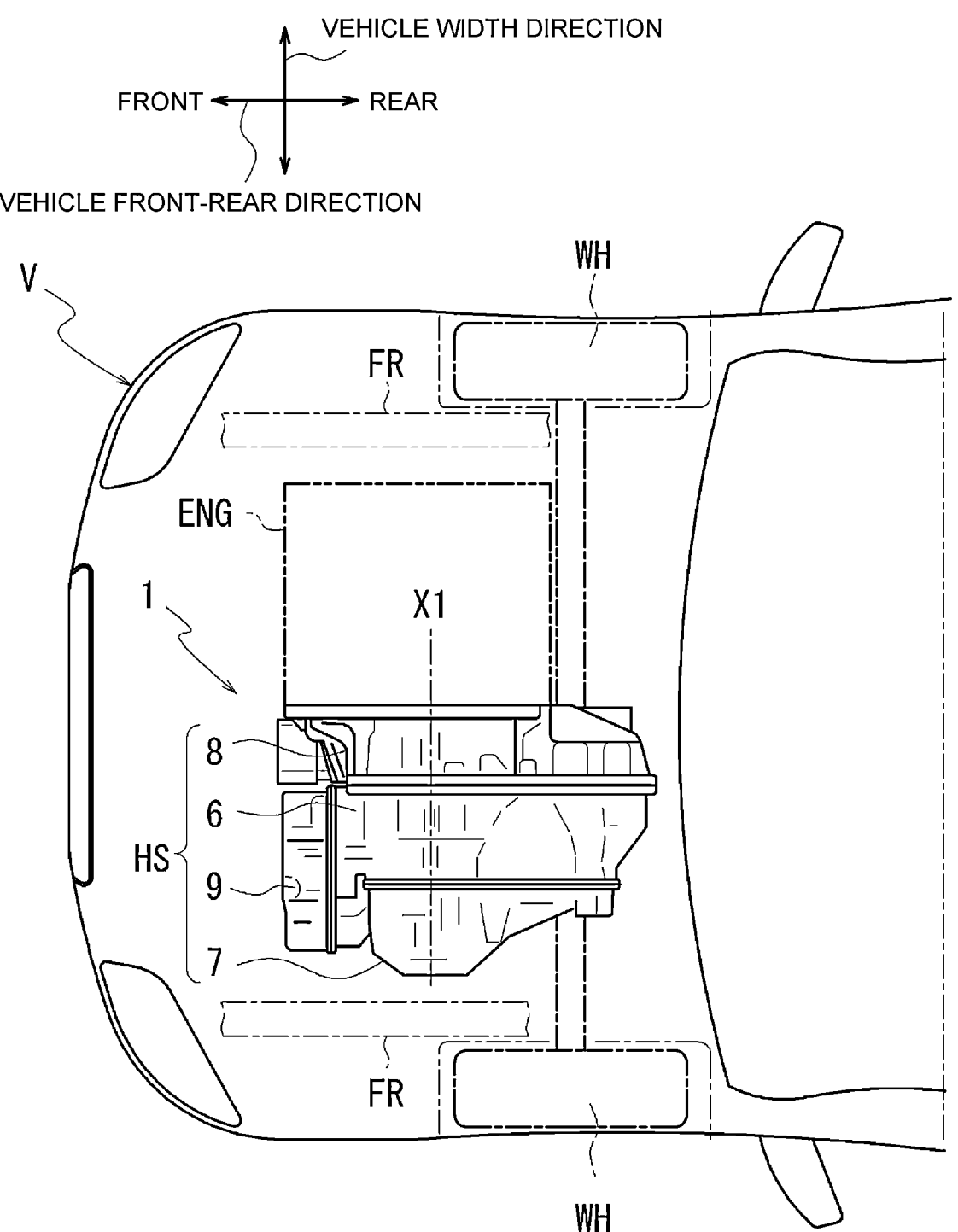
FIG. 1 is a diagram illustrating disposition of a power transmission device in a vehicle.

First, definitions of terms in the present specification will be described.

A power transmission device is a device that includes at least a power transmission mechanism, and the power transmission mechanism is, for example, at least one of a gear mechanism, a differential gear mechanism, or a speed reduction mechanism.

In the following embodiment, a case where a power transmission device 1 has a function of transmitting output rotation of an engine will be exemplified. The power transmission device 1 may be any device that transmits output rotation of at least one of the engine or a motor (rotary electric).

The expression "overlap when viewed in a predetermined direction" means that a plurality of elements are disposed in a predetermined direction, and has the same meaning as the description "overlap in a predetermined direction".

The expression "predetermined direction" is, for example, an axial direction, a radial direction, a gravity direction, or a vehicle traveling direction (vehicle forward direction, vehicle backward direction).

When the drawing illustrates that a plurality of elements (members, portions, or the like) are disposed in a predetermined direction, in the description of the present description, it may be considered that there is a sentence explaining that the plurality of elements overlap when viewed in the predetermined direction.

The expressions "do not overlap when viewed in a predetermined direction" and "offset when viewed in a predetermined direction" mean that a plurality of elements are not disposed in a predetermined direction, and have the same meaning as the descriptions "do not overlap in a predetermined direction" and "offset in a predetermined direction". The expression "predetermined direction" is, for example, an axial direction, a radial direction, a gravity direction, or a vehicle front-rear direction.

When the drawing illustrates that a plurality of elements (members, portions, or the like) are not disposed in a predetermined direction, in the description of the present description, it may be considered that there is a sentence explaining that the plurality of elements do not overlap when viewed in the predetermined direction.

The expression "a first element (member, portion, or the like) is located between a second element (member, portion, or the like) and a third element (member, portion, or the like) when viewed in a predetermined direction" means that when viewed from the predetermined direction, it can be observed that the first element is between the second element and the third element. The expression "predetermined direction" is, for example, an axial direction, a radial direction, a gravity direction, or a vehicle front-rear direction.

For example, when the second element, the first element, and the third element are disposed in this order along the axial direction, it can be said that the first element is located between the second element and the third element when viewed in the radial direction. When the drawing illustrates that the first element is located between the second element and the third element when viewed in a predetermined direction, in the description of the present description, it may be considered that there is a sentence explaining that the first element is between the second element and the third element when viewed in the predetermined direction.

In a case in which two elements (members, portions, or the like) overlap when viewed in the axial direction, the two elements are coaxial.

The expression "axial direction" means an axial direction of a rotation axis of a member that constitutes a power transmission device. The expression "radial direction" means a direction orthogonal to the rotation axis of the member that constitutes the power transmission device. The member is, for example, a motor, a gear mechanism, or a differential gear mechanism.

The expression "vertically placed" of a control valve means that, in the case of the control valve having a basic configuration in which a separate plate is interposed between valve bodies, the valve body of the control valve is stacked in a horizontal line direction with reference to an installation state of a power transmission device on the vehicle. Here, the expression "horizontal line direction" does not mean a horizontal line direction in a strict sense, and includes a case where a stacking direction is inclined with respect to the horizontal line.

Further, the expression "vertically placed" of the control valve means that the control valve is disposed in a direction in which a plurality of regulator valves in the control valve are arranged in a vertical line VL direction with reference to the installation state of the power transmission device on the vehicle.

The expression "a plurality of regulator valves are arranged in a vertical line VL direction" means that the regulator valves in the control valve are disposed to be shifted in the vertical line VL direction.

In this case, it is not necessary to strictly align the plurality of regulator valves in the vertical line VL direction.

For example, in a case where a control valve is formed by stacking a plurality of valve bodies, a plurality of regulator valves may be arranged in the vertical line VL direction while shifting a position in the stacking direction of the valve bodies in a vertically placed control valve.

Further, when viewed from an axial direction (forward and backward movement direction) of the valve bodies provided in the regulator valves, the plurality of regulator valves do not need to be arranged at intervals in the vertical line VL direction.

When viewed from the axial direction (forward and backward movement direction) of the valve bodies provided in the regulator valves, the plurality of regulator valves do not need to be adjacent to each other in the vertical line VL direction.

For example, when the regulator valves arranged in the vertical line VL direction are disposed to be shifted from each other in the stacking direction (horizontal line direction) of the valve bodies, the regulator valves adjacent to each other in the vertical line VL direction may be provided in a partial overlapping positional relation when viewed from the stacking direction.

Further, when the control valve is "vertically placed", it means that the plurality of regulator valves in the control valve are disposed such that a moving direction of the valve bodies (spool valve) provided in the regulator valves is aligned with the horizontal line direction.

In this case, the moving direction of the valve bodies (spool valve) is not limited to the horizontal line direction in a strict sense. In this case, the moving direction of the valve bodies (spool valve) is a direction along a rotation axis X of the power transmission device. In this case, a rotation axis X direction is the same as a sliding direction of the valve bodies (spool valve).

Hereinafter, an embodiment of the present invention will be described.

FIG. 1 is a schematic diagram illustrating disposition of the power transmission device 1 in a vehicle V.

Figure 2:
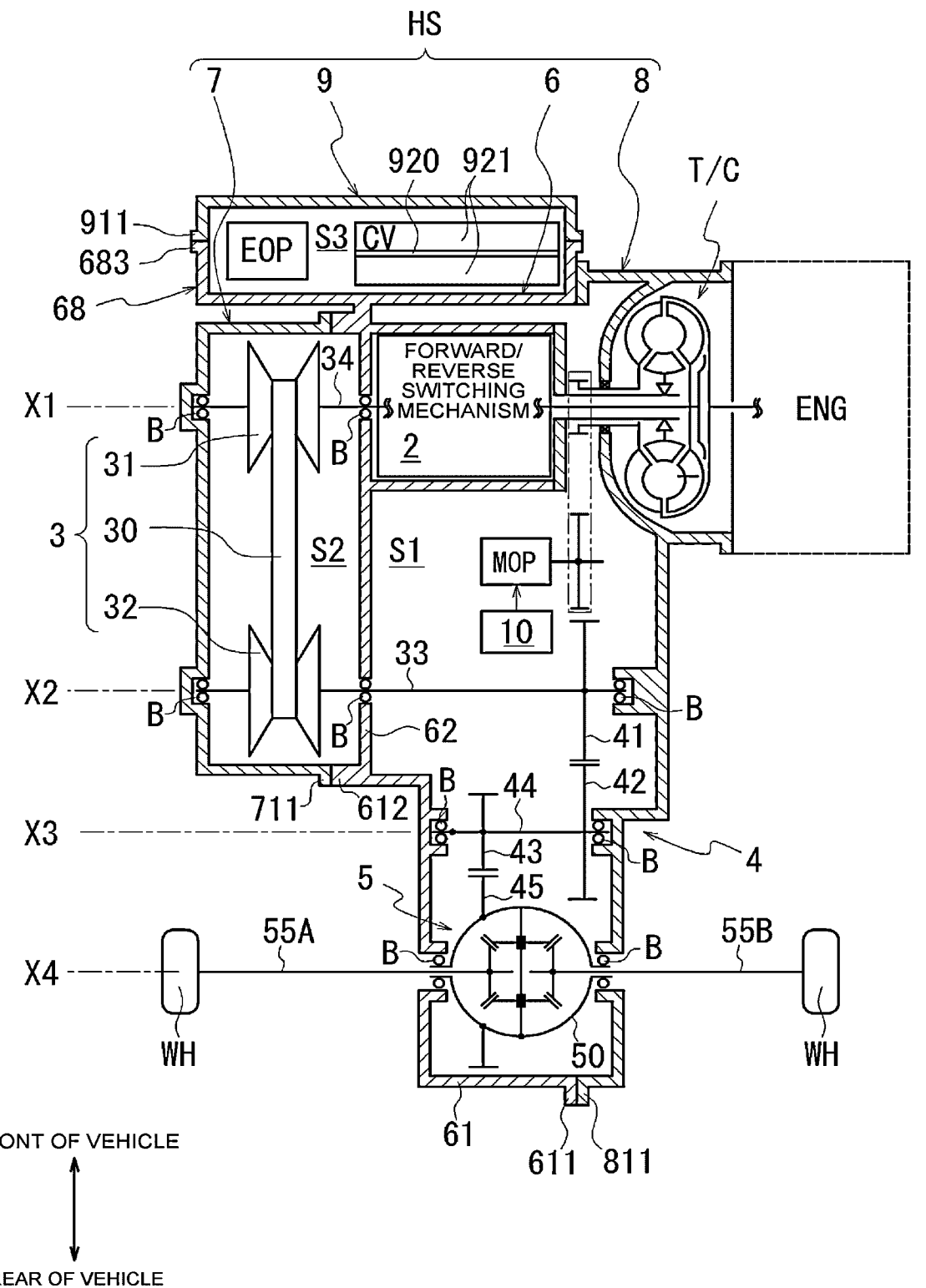
FIG. 2 is a schematic diagram illustrating a schematic configuration of the power transmission device.

FIG. 2 is a schematic diagram illustrating a schematic configuration of the power transmission device 1.

As illustrated in FIG. 1, the power transmission device 1 in a front portion of the vehicle V is disposed between left and right frames FR and FR. A housing HS of the power transmission device 1 includes a case 6, a first cover 7, a second cover 8, and a third cover 9.

As illustrated in FIG. 2, a torque converter T/C, a forward/reverse switching mechanism 2, a variator 3, a speed reduction mechanism 4, a differential 5, an electric oil pump EOP, a mechanical oil pump MOP, a control valve CV, and the like are accommodated in the housing HS.

Here, the torque converter T/C, the forward/reverse switching mechanism 2, the variator 3, the speed reduction mechanism 4, and the differential 5 are components of a power transmission mechanism in the invention.

In the power transmission device 1, the output rotation of an engine ENG (a drive source) is input to the forward/reverse switching mechanism 2 via the torque converter T/C.

The rotation input to the forward/reverse switching mechanism 2 is input to a primary pulley 31 of the variator 3 by forward rotation or reverse rotation.

In the variator 3, by changing a winding radius of a belt 30 between the primary pulley 31 and the secondary pulley 32, the rotation input to the primary pulley 31 is shifted at a desired speed ratio and output from an output shaft 33 of the secondary pulley 32.

The output rotation of the secondary pulley 32 is input to the differential 5 (differential gear mechanism) via the speed reduction mechanism 4, and then transmitted to drive wheels WH, WH via a left drive shaft 55A and a right drive shaft 55B.

The speed reduction mechanism 4 includes an output gear 41, an idler gear 42, a reduction gear 43, and a final gear 45.

The output gear 41 rotates integrally with the output shaft 33 of the secondary pulley 32.

The idler gear 42 meshes with the output gear 41 so as to be capable of transmitting rotation. The idler gear 42 is spline-fitted to an idler shaft 44. The idler gear 42 rotates integrally with the idler shaft 44. The reduction gear 43 having a diameter smaller than that of the idler gear 42 is provided on the idler shaft 44. The reduction gear 43 meshes with the final gear 45 fixed to an outer periphery of a differential case 50 of the differential 5 so as to be capable of transmitting rotation.

In the power transmission device 1, the forward/reverse switching mechanism 2, the torque converter T/C, and an output shaft of the engine ENG are disposed coaxially (coaxially) on a rotation axis X1 (first axis) of the primary pulley 31.

The output shaft 33 of the secondary pulley 32 and the output gear 41 are coaxially disposed on a rotation axis X2 (second axis) of the secondary pulley 32.

The idler gear 42 and the reduction gear 43 are coaxially disposed on a common rotation axis X3 (third axis).

The final gear 45 and the drive shafts 55A and 55B are coaxially disposed on a common rotation axis X4 (fourth axis). In the power transmission device 1, the rotation axes X1 to X4 are set to be parallel to each other. Hereinafter, the rotation axes X1 to X4 are collectively referred to as the rotation axis X of the power transmission device 1 (power transmission mechanism) as necessary.

Figure 3:
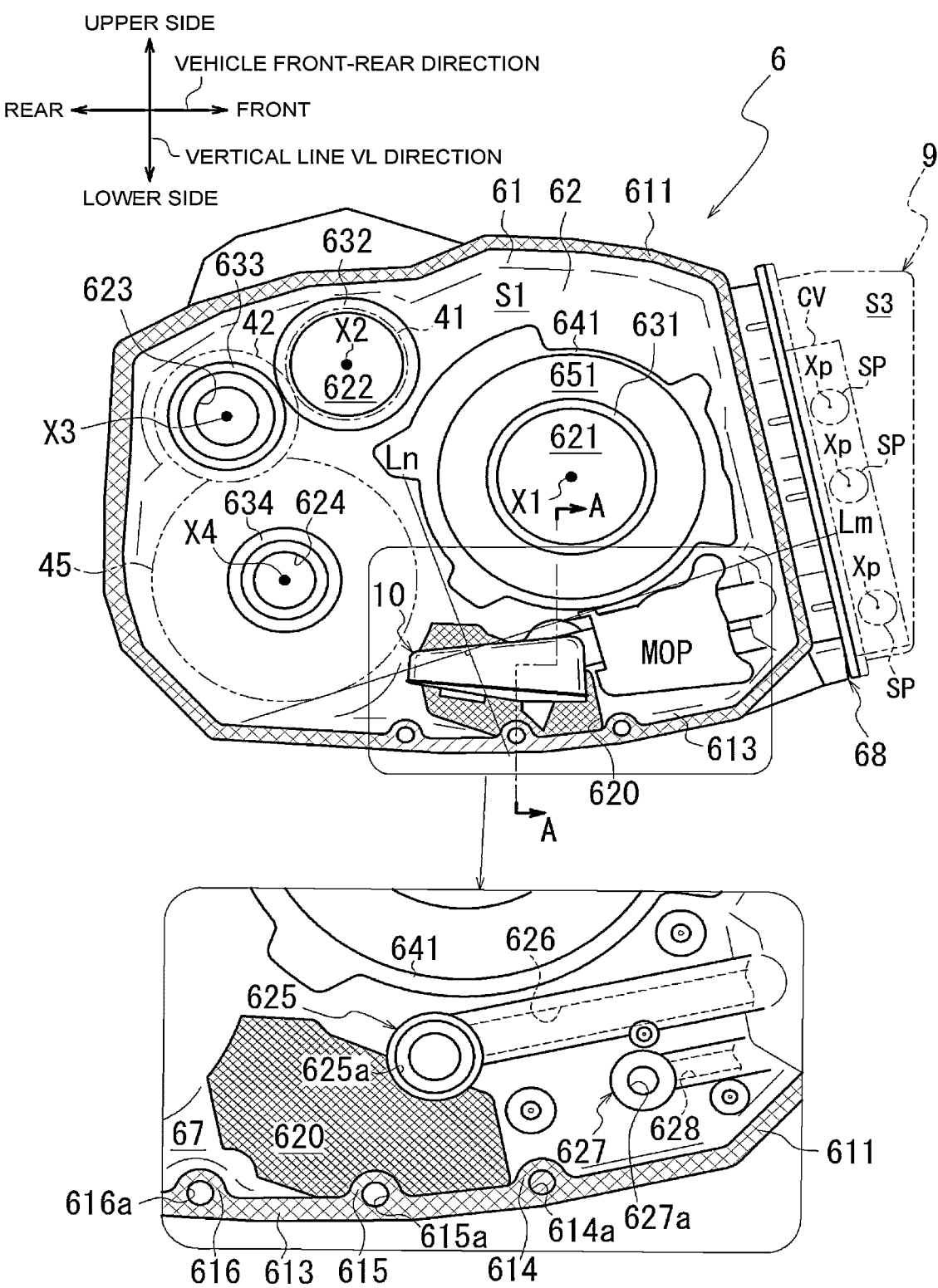
FIG. 3 is a view of a case when viewed from a second cover side.
Figure 4:
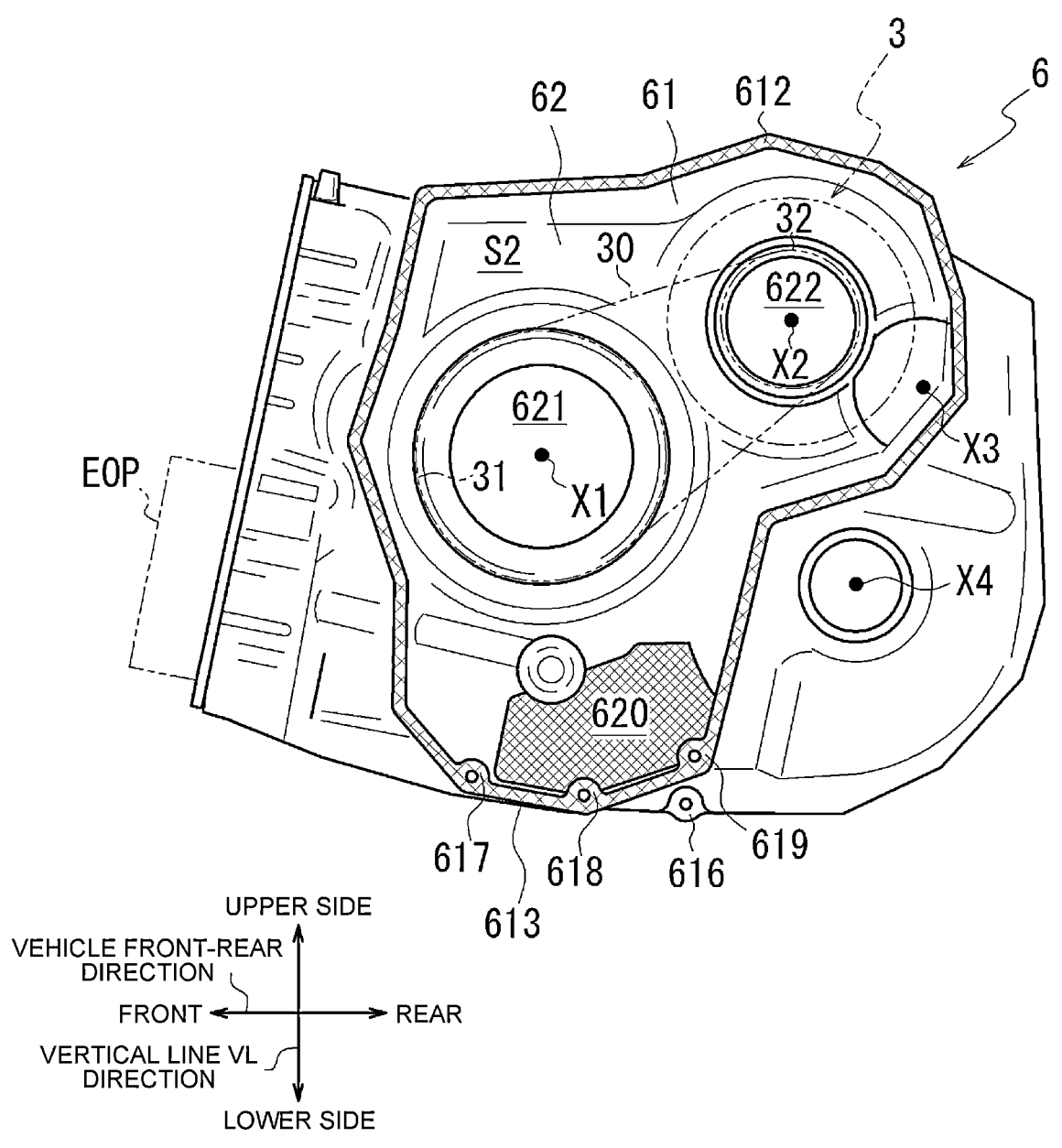
FIG. 4 is a view of the case when viewed from a first cover side.

FIG. 3 is a plan view of the case 6 when viewed from a second cover 8 side. FIG. 4 is a plan view of the case 6 when viewed from a first cover 7 side. In an enlarged view of FIG. 3, the strainer 10 and the mechanical oil pump MOP are not illustrated, and the surroundings of connection portions 625 and 627 provided in a partition wall portion 62 are illustrated. Further, in FIGS. 3 and 4, in order to facilitate understanding of a position of an opening portion 620, hatching crossing a region of the opening portion 620 is indicated.

Figure 5:
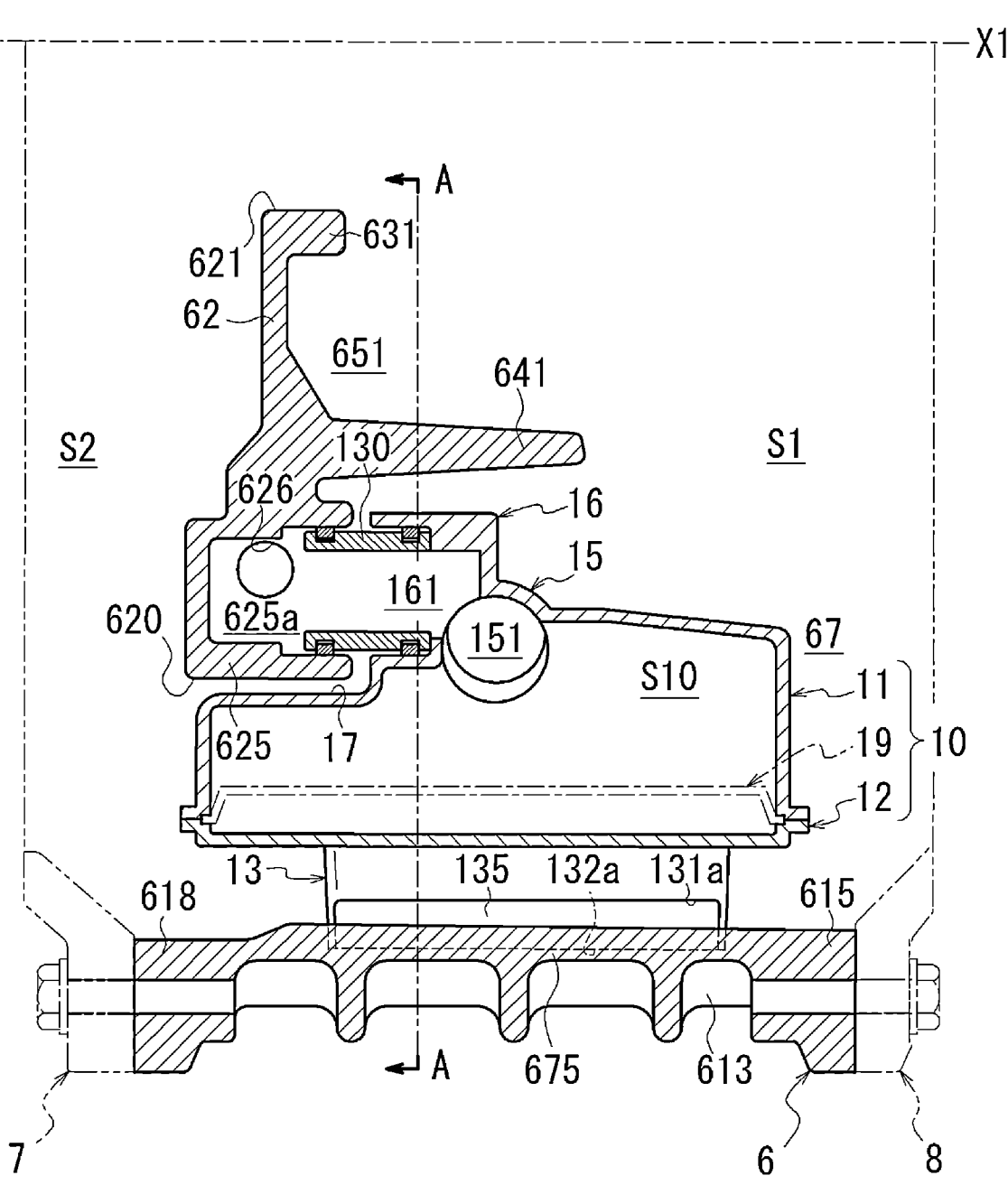
FIG. 5 is a cross-sectional view illustrating disposition of a strainer in an accommodation portion.
Figure 6:
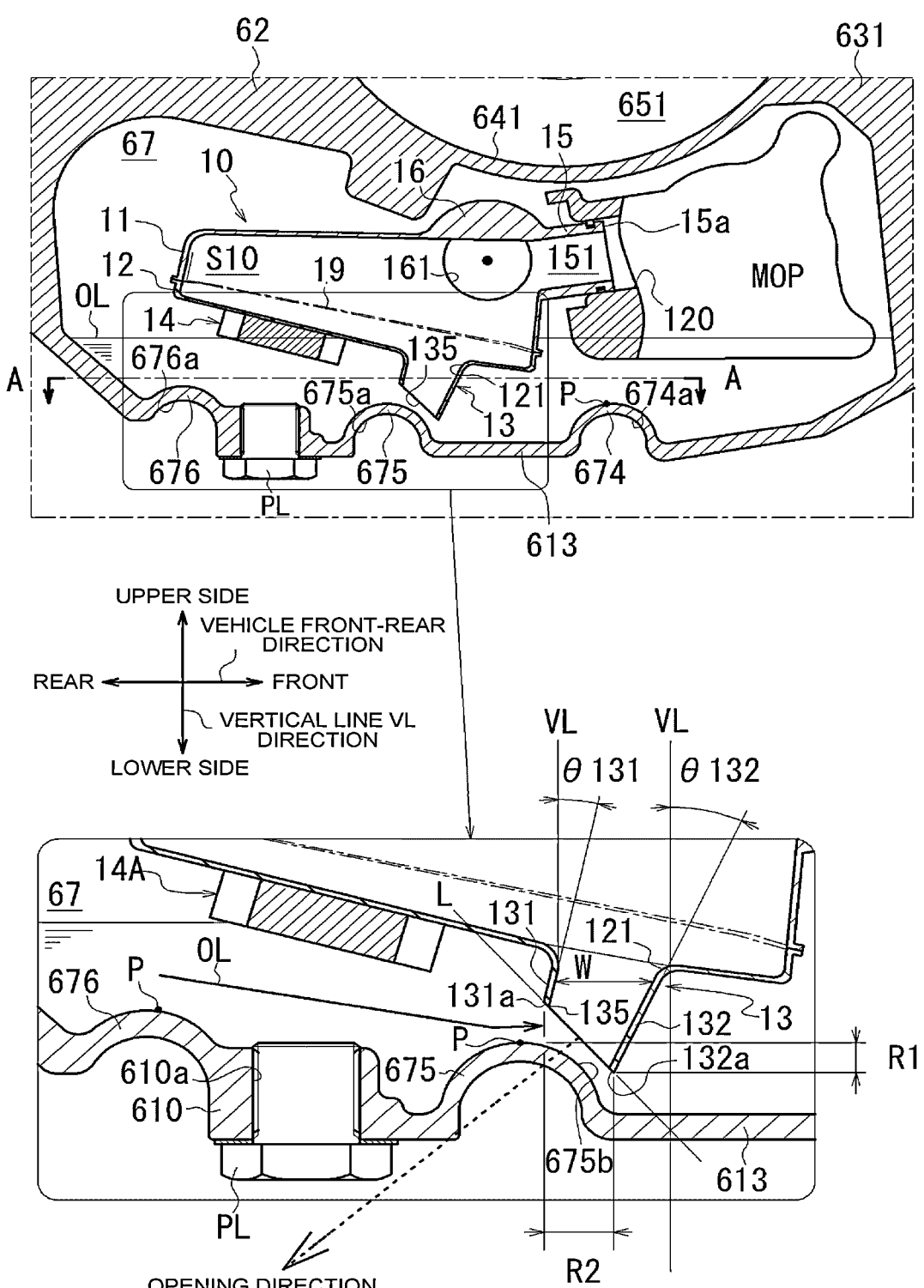
FIG. 6 is a cross-sectional view illustrating disposition of the strainer in the accommodation portion.

FIG. 5 is a schematic cross-sectional view of the case 6 taken along a line A-A in FIG. 3. FIG. 6 is a schematic cross-sectional view of the case 6 taken along the line A-A in FIG. 5.

As illustrated in FIG. 3, the case 6 includes a tubular peripheral wall portion 61 and the partition wall portion 62. The partition wall portion 62 is provided in a range that crosses the rotation axis (the rotation axis X1 to the rotation axis X4) of the power transmission mechanism.

As illustrated in FIG. 2, the partition wall portion 62 partitions a space inside the peripheral wall portion 61 into two in the rotation axis X1 direction. One side of the partition wall portion 62 in the rotation axis X1 direction is a first chamber S1, and the other side is a second chamber S2.

The forward/reverse switching mechanism 2, the speed reduction mechanism 4, and the differential 5 are accommodated in the first chamber S1. The variator 3 is accommodated in the second chamber S2.

In the case 6, an opening on a first chamber S1 side is sealed by the second cover 8 (torque converter cover). An opening on a second chamber S2 side is sealed by the first cover 7 (side cover).

In the case 6, an operation of the power transmission device 1 and the oil used for lubrication of the components of the power transmission device 1 are stored in lower portions of spaces (the first chamber S1 and the second chamber S2) between the first cover 7 and the second cover 8.

As illustrated in FIG. 3, in the case 6, an end surface on the second cover 8 side (front side of the page surface) is a joint portion 611 with the second cover 8. The joint portion 611 is a flange-shaped portion that surrounds an opening of the partition wall portion 62 on the second cover 8 side over the entire circumference. A joint portion 811 (see FIG. 2) on the second cover 8 side is joined to the joint portion 611 over the entire circumference. The case 6 and the second cover 8 are connected to each other by bolts (not illustrated) in a state where the joint portions 611 and 811 are joined to each other. Accordingly, an opening of the case 6 is held in a sealed state by the second cover 8, and the closed first chamber S1 is formed.

As illustrated in FIG. 3, in the case 6, the partition wall portion 62 is located inside the joint portion 611.

The partition wall portion 62 of the case 6 is provided in a direction substantially orthogonal to a rotation axis (the rotation axis X1 to the rotation axis X4). The partition wall portion 62 is provided with through holes 621, 622, and 624 and a support hole 623.

The through hole 621 is formed around the rotation axis X1. A cylindrical support wall portion 631 surrounding the through hole 621 and a peripheral wall portion 641 surrounding an outer periphery of the support wall portion 631 with an interval therebetween are provided on a surface of the partition wall portion 62 on the first chamber S1 side (a front side of the page surface). In FIG. 3, the support wall portion 631 and the peripheral wall portion 641 protrude toward the front side of the page surface (a second cover 8 side in FIG. 2).

A region 651 between the support wall portion 631 and the peripheral wall portion 641 is a ring-shaped space for accommodating a piston (not illustrated) of the forward/reverse switching mechanism 2, a friction plate (a forward clutch, a reverse brake), and the like.

An input shaft 34 (see FIG. 2) of the primary pulley 31 is rotatably supported on an inner periphery of the support wall portion 631 via a bearing B.

As illustrated in FIG. 3, the through hole 622 is formed around the rotation axis X2.

In the power transmission device 1 mounted on the vehicle V, the rotation axis X2 is located obliquely upward on a vehicle rear side when viewed from the rotation axis X1.

A cylindrical support wall portion 632 surrounding the through hole 622 is provided on a surface of the partition wall portion 62 on the first chamber S1 side (a front side of the page surface). In FIG. 3, the support wall portion 632 protrudes toward the front side of the page surface (a second cover 8 side in FIG. 2).

The output shaft 33 (see FIG. 2) of the secondary pulley 32 is rotatably supported on an inner periphery of the support wall portion 632 via the bearing B.

As illustrated in FIG. 3, the support hole 623 is a bottomed hole formed around the rotation axis X3.

In the power transmission device 1 mounted on the vehicle V, the rotation axis X3 is located obliquely upward on the vehicle rear side when viewed from the rotation axis X1 and obliquely downward on the vehicle rear side when viewed from the rotation axis X2.

A cylindrical support wall portion 633 surrounding the support hole 623 is provided on the surface of the partition wall portion 62 on the first chamber S1 side (a front side of the page surface). In FIG. 3, the support wall portion 633 protrudes toward the front side of the page surface (a second cover 8 side in FIG. 2). The support wall portion 633 surrounds an outer periphery of the support hole 623 at intervals. One end side of the idler shaft 44 (see FIG. 2) of the speed reduction mechanism 4 is rotatably supported on an inner periphery of the support wall portion 633 via the bearing B.

As illustrated in FIG. 3, the through hole 624 is formed around the rotation axis X4.

In the power transmission device 1 mounted on the vehicle V, the rotation axis X4 is obliquely downward on the vehicle rear side when viewed from the rotation axis X1, obliquely downward on the vehicle rear side when viewed from the rotation axis X2, and obliquely downward on a vehicle front side when viewed from the rotation axis X3.

A cylindrical support wall portion 634 surrounding the through hole 624 is provided on the surface of the partition wall portion 62 on the first chamber S1 side (a front side of the page surface). In FIG. 3, the support wall portion 634 protrudes toward the front side of the page surface (a second cover 8 side in FIG. 2). The support wall portion 634 surrounds an outer periphery of the through hole 624 at intervals. The differential case 50 (see FIG. 2) of the differential 5 is rotatably supported on an inner periphery of the support wall portion 634 via the bearing B.

As illustrated in FIG. 2, the final gear 45 having a ring shape when viewed in the rotation axis X4 direction is fixed to an outer periphery of the differential case 50. The final gear 45 rotates integrally with the differential case 50 about the rotation axis X4.

As illustrated in FIG. 4, in the case 6, an accommodation portion 67 of the strainer 10 is disposed on a region on the vehicle front side of the final gear 45, that is, a region on a lower side of the arc-shaped peripheral wall portion 641.

As illustrated in FIG. 5, the accommodation portion 67 is a region on a lower side of the first chamber S1. The accommodation portion 67 is a bottomed space having an opening facing the second cover 8 side (a right side in FIG. 5).

As illustrated in FIG. 3, the accommodation portion 67 is located at a lower portion in the case 6. Specifically, the accommodation portion 67 is located in the lower portion in the case 6 in the vertical line VL direction with respect to the installation state of the power transmission device 1 on the vehicle.

As illustrated in FIG. 3, in the case 6, a lower region of the peripheral wall portion 61 in the vertical line VL direction is a bottom wall portion 613 of the case 6. An inner side of the bottom wall portion 613 is the accommodation portion 67.

The bottom wall portion 613 is provided with boss portions 614, 615, 616 having bolt insertion holes 614*a*, 615*a*, 616*a*. The boss portions 614, 615, and 616 are provided integrally with the joint portion 611.

The boss portions 614, 615, 616 are arranged at intervals in a circumferential direction of the peripheral wall portion 61. The opening portion 620 when viewed from the second cover 8 side (a front side of the page surface) is located between the boss portions 614 and 616, and is provided in a positional relation in which the boss portion 615 overlaps the opening portion 620.

As illustrated in FIG. 5, in the lower portion of the case 6, the accommodation portion 67 is formed in a range that crosses, in the rotation axis X1 direction, a lower portion of the region 651 (a recess) where the forward/reverse switching mechanism 2 is accommodated.

In the lower portion of the case 6, the opening portion 620 is formed in the partition wall portion 62. The first chamber S1 and the second chamber S2 in the case 6 communicate with each other via the opening portion 620.

As illustrated in FIG. 3, the opening portion 620 is provided at a position intersecting with a tangent line Lm when viewed from the rotation axis X1 direction. The tangent line Lm is a straight line connecting an outer periphery of the peripheral wall portion 641 and an outer periphery of the final gear 45.

The opening portion 620 is formed in a range from a region between the final gear 45 and the peripheral wall portion 641 to the vicinity (a lower portion) of the bottom wall portion 613 of the case 6 across the tangent line Lm from above to below along a straight line Ln. Here, the straight line Ln is a straight line that passes between the final gear 45 and the peripheral wall portion 641 and is orthogonal to the tangent line Lm.

As illustrated in FIG. 5, in the partition wall portion 62, the connection portion 625 of the strainer 10 is provided at a position adjacent to the peripheral wall portion 641 in a radial direction of the rotation axis X1. The connection portion 625 is a tubular portion in which an opening side of a connection port 625*a* faces the second cover 8 side (the first chamber S1).

As illustrated in FIG. 3, when viewed from the rotation axis X1 direction, the connection portion 625 is provided in a positional relation in which a part of a region on a lower side overlaps the opening portion 620. The part of the region on the lower side of the connection portion 625 protrudes into the opening portion 620 when viewed from the rotation axis X1 direction.

As illustrated in FIG. 5, an oil passage 626 is open to a back side of the connection portion 625.

As illustrated in FIG. 3, the oil passage 626 extends linearly in a direction away from the opening portion 620 in the partition wall portion 62. The oil passage 626 is connected to the electric oil pump EOP (see FIG. 2) installed in an accommodation chamber S3 to be described later via an oil passage in the case 6.

As illustrated in the enlarged view of FIG. 3, in the accommodation portion 67, a connection portion 627 with the mechanical oil pump MOP is provided on a lower side of the oil passage 626. A connection port 627*a* of the connection portion 627 opens in the same direction as the connection portion 625 with the strainer 10. The connection port 627*a* of the connection portion 627 communicates with an oil passage 628 provided in the partition wall portion 62.

The oil passage 628 extends on a lower side of the oil passage 626 to an accommodation chamber S3 side (a right side in FIG. 3) along the oil passage 626. The oil passage 628 communicates with the control valve CV (see FIG. 2) installed in the accommodation chamber S3 via an oil passage in the case 6.

As illustrated in FIG. 2, an accommodation portion 68 having an opening facing the vehicle front side is attached to a vehicle front side surface of the case 6. The accommodation chamber S3 is formed by sealing the opening of the accommodation portion 68 with the third cover 9.

The accommodation portion 68 and the third cover 9 are connected to each other by bolts (not illustrated) in a state where joint portions 683 and 911 are joined to each other. Accordingly, the closed accommodation chamber S3 is formed on the vehicle front side surface of the case 6.

The control valve CV and the electric oil pump EOP are vertically placed in the accommodation chamber S3.

As illustrated in FIG. 2, the control valve CV has a basic configuration in which a separate plate 920 is sandwiched between valve bodies 921 and 921. A hydraulic control circuit (not illustrated) is formed inside the control valve CV. The hydraulic control circuit is provided with a solenoid that is driven based on a command from a control device (not illustrated), and a regulator valve SP (a spool valve) that is operated by a signal pressure or the like generated by the solenoid.

In the accommodation chamber S3, the control valve CV is vertically placed such that a stacking direction of the valve bodies 921 and 921 is aligned with a vehicle front-rear direction (an up-down direction in the page surface).

In the accommodation chamber S3, the control valve CV is vertically placed to satisfy the following conditions. (a) A plurality of regulator valves SP (spool valves) in the control valve CV are arranged in the vertical line VL direction (an up-down direction) based on the installation state of the power transmission device 1 on the vehicle V (see FIG. 3), and (b) a forward and backward movement direction Xp of the regulator valve SP (a spool valve) is oriented along the horizontal line direction (see FIG. 3).

Accordingly, the control valve CV is vertically placed in the accommodation chamber S3 while preventing the forward and backward movement of the regulator valve SP (a spool valve). Accordingly, the accommodation chamber S3 is not increased in size in the vehicle front-rear direction.

The electric oil pump EOP is vertically placed such that a rotation axis of a motor (not illustrated) extends along the vertical line VL direction.

As illustrated in FIG. 2, the electric oil pump EOP and the control valve CV are arranged in the rotation axis X direction (a left-right direction in FIG. 2) of the power transmission mechanism.

As illustrated in FIG. 3, in the lower portion of the case 6, the opening portion 620 is provided on a lower side of the peripheral wall portion 641. The opening portion 620 is provided along an inner periphery of the peripheral wall portion 61 (a joint portion 611) on a vehicle front side of the final gear 45. The opening portion 620 is formed to have such a size that a part of the strainer 10 can be inserted when viewed from the rotation axis X1 direction.

As illustrated in FIG. 4, on a surface of the case 6 on the first cover 7 side, the opening portion 620 is located at a lower portion of the peripheral wall portion 61 surrounding the second chamber S2. Inside the peripheral wall portion 61, the through holes 621 and 622 are opened on an upper side of the partition wall portion 62.

A joint portion 612 with the first cover 7 is provided on an end surface of the peripheral wall portion 61 on the first cover 7 side. The joint portion 612 is a flange-shaped portion that surrounds an opening of the partition wall portion 62 on the first cover 7 side over the entire circumference. The partition wall portion 62 is disposed inside the joint portion 612.

A joint portion 711 (see FIG. 2) on the first cover 7 side is joined to the joint portion 612 over the entire circumference. The case 6 and the first cover 7 are connected to each other by bolts (not illustrated) in a state where the joint portions 612 and 711 are joined to each other. Accordingly, an opening of the case 6 is held in a sealed state by the first cover 7, and the closed second chamber S2 is formed.

As illustrated in FIG. 4, the through hole 621 is located obliquely upward on the vehicle front side when viewed from the opening portion 620. The through hole 622 is located obliquely upward on the vehicle rear side when viewed from the through hole 621.

Inside the peripheral wall portion 61, the primary pulley 31 and the secondary pulley 32 of the variator 3 are located in an upper region in the vertical line VL direction.

In the peripheral wall portion 61, a lower portion side of a region where the primary pulley 31 is provided largely bulges toward a lower portion side of the case 6. The opening portion 620 is located at a lowermost part of the bulged region.

On a bottom wall portion 613 side of the joint portion 612, boss portions 617, 618, and 619 are provided along the peripheral wall portion 61.

In the rotation axis X direction of the power transmission device 1, the boss portions 617 and 618 are provided coaxially with the boss portions 614 and 615 (see FIG. 3), respectively. The boss portion 616 is located below the boss portion 619.

When the power transmission device 1 is driven, the oil OL supplied via an oil passage (not illustrated) is injected toward the belt 30 of the variator 3 in the second chamber S2 to lubricate the belt 30 of the variator 3.

The oil OL having lubricated the belt 30 moves toward a lower portion where the opening portion 620 is provided in the second chamber S2 by its own weight. The oil OL that has moved to the lower portion passes through the opening portion 620 and is returned to a lower portion of the first chamber S1 in which the strainer 10 is disposed.

As illustrated in FIG. 6, the strainer 10 has a basic configuration in which a filter 19 is disposed in a space S10 formed between an upper case 11 and a lower case 12. The upper case 11 and the lower case 12 are made of a resin material.

Figure 7:
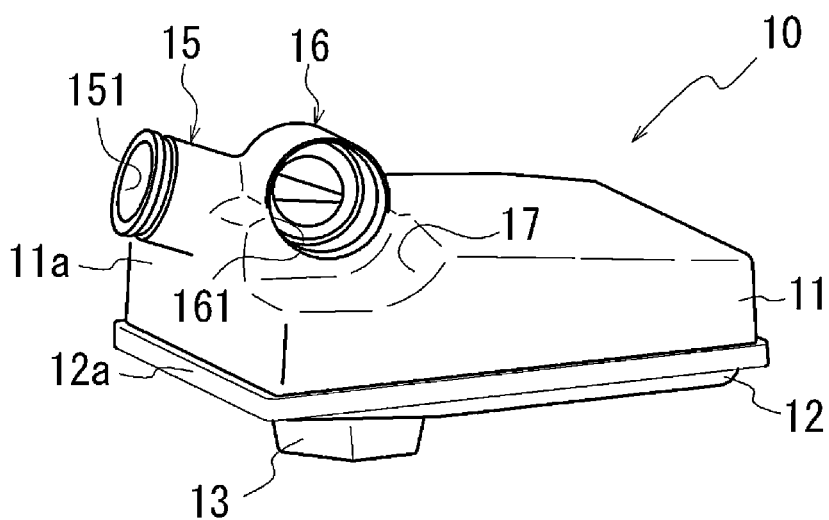
FIG. 7 is a diagram illustrating the strainer.
Figure 8:
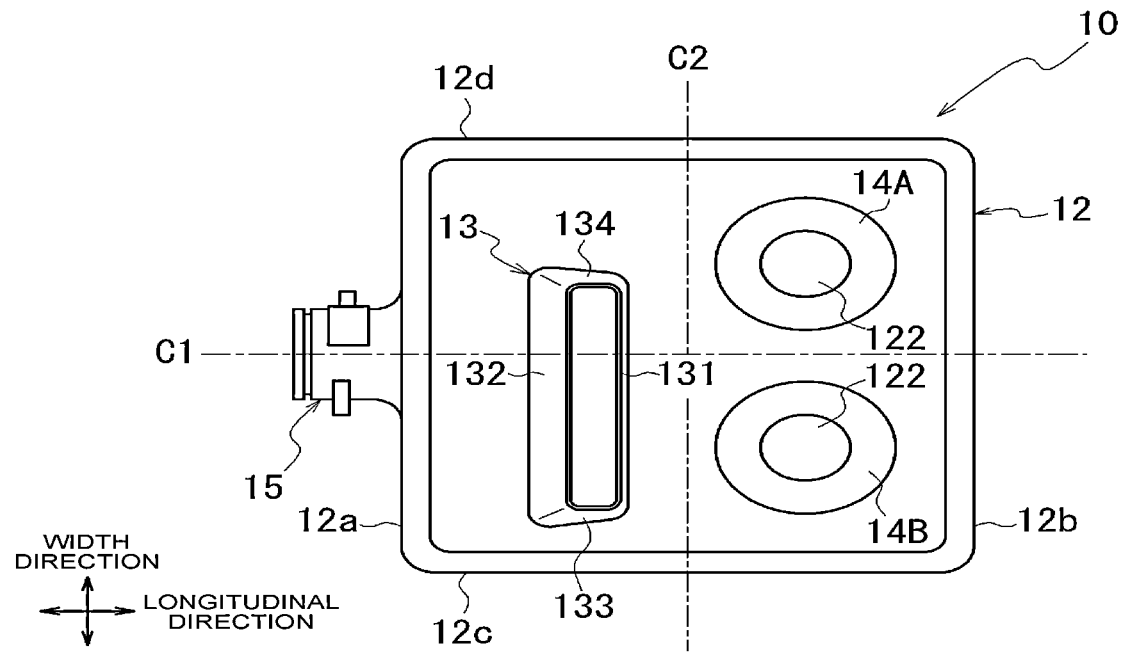
FIG. 8 is a diagram illustrating the strainer.

FIG. 7 is a perspective view of the strainer 10 when viewed from above an upper case 11 side. FIG. 8 is a plan view of the strainer 10 when viewed from below a lower case 12 side.

In the following description, a center line C1 is a straight line that passes through substantially the middle of the strainer 10 in a width direction (an up-down direction in the drawing). A center line C2 is a straight line that passes through substantially the middle of the strainer 10 in a longitudinal direction (a left-right direction in the drawing) and is orthogonal to the center line C1.

As illustrated in FIGS. 7 and 8, a first connection portion 15 is provided on a side portion 11a of the upper case 11. The first connection portion 15 is a tubular member having a discharge passage 151 of oil therein, and the first connection portion 15 protrudes obliquely upward from the side portion 11a of the upper case 11.

As illustrated in FIG. 8, when the strainer 10 is viewed from below, the first connection portion 15 protrudes in a direction away from the center line C2 along the center line C1.

As illustrated in FIG. 7, a second connection portion 16 is provided on a root side of the first connection portion 15. The second connection portion 16 has a bottomed cylindrical shape having a discharge passage 161 of the oil OL. The second connection portion 16 is provided such that an opening of the discharge passage 161 is directed in a direction (a direction along the center line C2) orthogonal to the center line C1.

As illustrated in FIG. 6, the discharge passage 161 in the second connection portion 16 and the discharge passage 151 in the first connection portion 15 open to the space S10 inside the strainer 10.

As illustrated in FIG. 7, in the upper case 11, a recess 17 (a cutout portion) recessed toward the lower case 12 side is provided in a region located on the extension of the discharge passage 161 in the second connection portion 16. Therefore, as illustrated in FIG. 5, a tubular member 130 for connecting the strainer 10 and the connection portion 625 on a partition wall portion 62 side can be inserted into the discharge passage 161 from a side of the strainer 10 without interfering with the upper case 11.

As illustrated in FIG. 6, an opening 121 that allows communication between the space S10 inside the strainer 10 and the outside of the strainer 10 is provided at a portion of the lower case 12 facing the bottom wall portion 613.

A peripheral wall 13 that surrounds the opening 121 over the entire circumference and magnets 14 (14A, 14B) are provided at a portion of the lower case 12 facing the bottom wall portion 613.

As illustrated in FIG. 8, the lower case 12 includes a first side surface 12a, a second side surface 12b, a third side surface 12c, and a fourth side surface 12d.

When viewed from below the bottom wall portion 613 side, the first side surface 12*a* and the second side surface 12*b* are substantially orthogonal to the center line C1. The first side surface 12*a* and the second side surface 12*b* are provided at an interval in a center line C1 direction. The third side surface 12*c* and the fourth side surface 12*d* are substantially orthogonal to the center line C2. The third side surface 12*c* and the fourth side surface 12*d* are provided at an interval in a center line C2 direction, and the third side surface 12*c* and the fourth side surface 12*d* connect ends of the first side surface 12*a* and the second side surface 12*b*.

As illustrated in FIG. 8, at a portion of the lower case 12 facing the bottom wall portion 613, the peripheral wall 13 is provided on a first connection portion 15 side (a left side in FIG. 8) when viewed from the center line C2, and the ring-shaped magnets 14 (14A, 14B) are provided on an opposite side of the first connection portion 15 side. In the following description, when the magnets 14A and 14B are not distinguished, the magnets 14A, 14B are simply referred to as the magnets 14.

In the lower case 12, columnar protrusions 122, 122 are provided in a region on a second side surface 12*b* side when viewed from the center line C2. The protrusions 122, 122 are provided in a symmetrical positional relation with the center line C1 interposed therebetween.

The ring-shaped magnets 14A, 14B are fitted onto and attached to the protrusions 122, 122. The magnet 14A is located substantially at the center of a region surrounded by the center line C1, the center line C2, the second side surface 12*b*, and the fourth side surface 12*d*. The magnet 14B is located substantially at the center of a region surrounded by the center line C1, the center line C2, the second side surface 12*b*, and the third side surface 12*c*.

The peripheral wall 13 is located on the first connection portion 15 side (a first side surface 12*a* side) when viewed from the center line C2 of the strainer 10. The peripheral wall 13 is formed in a cylindrical shape including a first side plate portion 131, a second side plate portion 132, a third side plate portion 133, and a fourth side plate portion 134.

The first side plate portion 131 and the second side plate portion 132 are provided at an interval in a direction along the center line C2. The first side plate portion 131 is located closer to the center line C2 than the second side plate portion 132.

The third side plate portion 133 and the fourth side plate portion 134 are provided in a direction along the center line C1. The third side plate portion 133 and the fourth side plate portion 134 connect ends of the first side plate portion 131 and the second side plate portion 132.

As illustrated in FIG. 6, each side plate portion (the first side plate portion 131, the second side plate portion 132, the third side plate portion 133, and the fourth side plate portion 134) of the peripheral wall 13 protrudes in the vertical line VL direction along a facing direction of the strainer 10 and the bottom wall portion 613.

The first side plate portion 131 and the second side plate portion 132 are respectively inclined at predetermined intersection angles θ131 and θ132 with respect to the vertical line VL. Here, the intersection angle θ131 of the first side plate portion 131 with respect to the vertical line is smaller than the intersection angle θ132 of the second side plate portion 132 with respect to the vertical line VL (θ131<θ132).

Therefore, in a cross-sectional view taken in a direction along the center line C1 (arrangement directions of the magnet 14 and the peripheral wall 13), the peripheral wall 13 is formed in a tapered shape in which a width W in the center line C1 direction (a vehicle front-rear direction) is narrower toward a distal end side.

A distal end 131*a* of the first side plate portion 131 is located above a distal end 132*a* of the second side plate portion 132 in the vertical line VL direction.

A suction port 135 of the oil OL is disposed on an end of the peripheral wall 13 on the bottom wall portion 613 side. With reference to the installation state of the power transmission device 1 on the vehicle, the peripheral wall 13 is provided such that an opening direction of the suction port 135 faces obliquely downward on the vehicle rear side.

Here, the opening direction of the suction port 135 is a direction orthogonal to an opening surface of the suction port 135, and the opening surface of the suction port 135 means a surface along a straight line L connecting the distal end 131*a* of the first side plate portion 131 and the distal end 132*a* of the second side plate portion 132. In the present embodiment, the straight line L intersects the vertical line VL with an inclination. The straight line L along the opening surface of the suction port 135 is inclined such that a position in the vertical line VL direction increases toward a magnet (a left side in the drawing).

In the case 6, a bulging portion 675 is provided in a region of the bottom wall portion 613 facing the peripheral wall 13 on a strainer 10 side. The bulging portion 675 is formed by recessing the bottom wall portion 613 toward the inside of the case 6. In a cross-sectional view, the bulging portion 675 is formed in a substantially semicircular shape in which a vertex P is directed upward in the vertical line VL direction.

In the lower portion of the case 6, the strainer 10 is provided such that the suction port 135 of the oil OL faces the bottom wall portion 613 (a bulging portion 675) of the case 6. That is, the strainer 10 is disposed to face the bottom wall portion 613 of the case 6.

Here, the "disposed to face" in the present specification means that the strainer 10 (a suction port 135) and the bottom wall portion 613 are disposed to face each other in a direction along the vertical line VL with reference to the installation state of the power transmission device 1 on the vehicle V. Therefore, when the strainer 10 is disposed to face the bottom wall portion 613, the strainer 10 and the bottom wall portion 613 are aligned with the vertical line VL. In this state, the suction port 135 of the strainer 10 faces the bottom wall portion 613 (the bulging portion 675) in the vertical line VL direction.

Accordingly, the opening direction of the suction port 135 in FIG. 6 may be referred to as a facing direction of the suction port 135 and the bulging portion 675.

Figure 9:
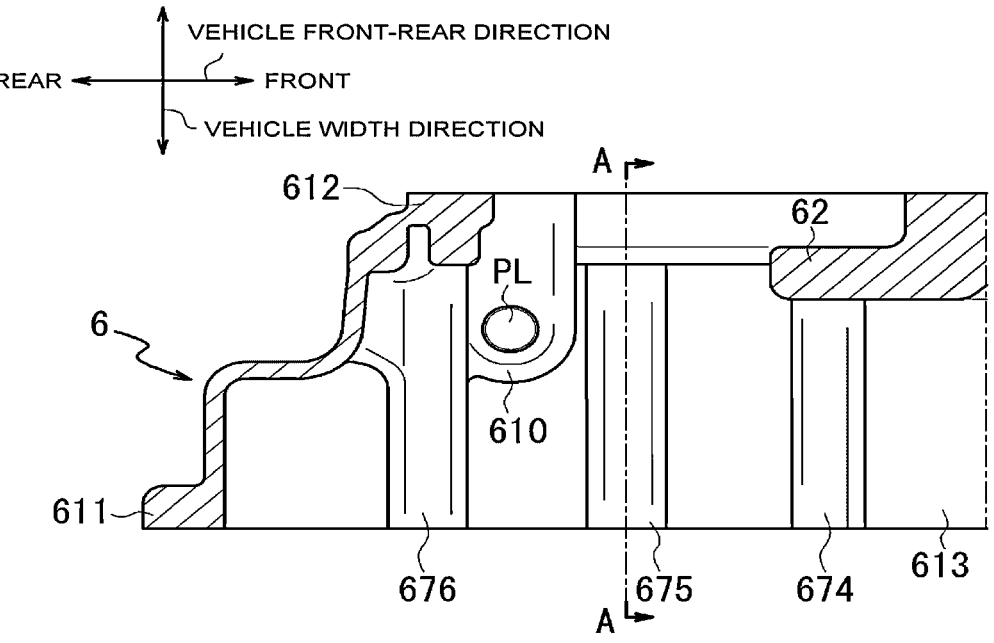
FIG. 9 is a diagram illustrating disposition of a bulging portion in the accommodation portion.

FIG. 9 is a diagram schematically illustrating a state in which the case 6 is cut along the line A-A in FIG. 6 and the bottom wall portion 613 is viewed from above.

Figure 10:
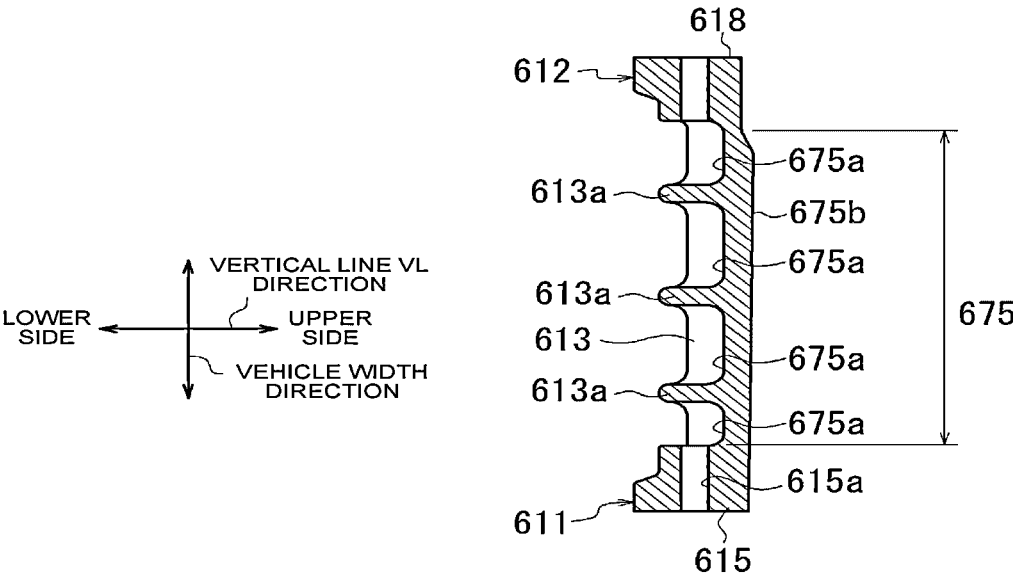
FIG. 10 is a cross-sectional view of the bulging portion.

FIG. 10 is a schematic cross-sectional view of the case 6 taken along the line A-A in FIG. 9.

Figure 11:
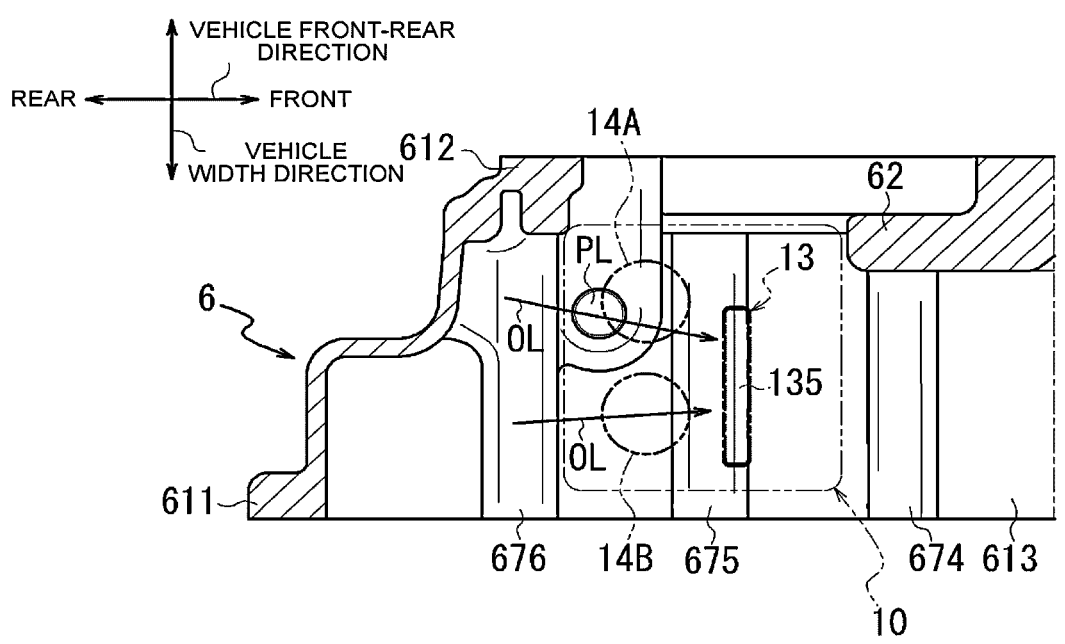
FIG. 11 is a diagram illustrating disposition of the bulging portion and the strainer in the accommodation portion.

FIG. 11 is a view in which the strainer 10 indicated by an imaginary line is superimposed and displayed in a region of the bottom wall portion 613 illustrated in FIG. 9.

As illustrated in FIGS. 9 and 10, the bulging portion 675 extends linearly in a vehicle width direction in the region of the bottom wall portion 613.

In the bottom wall portion 613, the bulging portion 675 is a region located between the joint portion 611 and the joint portion 612. The bulging portion 675 extends linearly toward the joint portion 612 on an extension of the boss portion 615. The bulging portion 675 extends to a region where the partition wall portion 62 (see FIG. 9) is provided.

The boss portion 615, the bulging portion 675, and the boss portion 618 are arranged in series in the vehicle width direction (see FIG. 10).

As illustrated in FIG. 10, a recess 675*a* recessed toward the inside of the case 6 is disposed on an outer surface (a surface on a left side in FIG. 10) of the region of the bulging portion 675. Reinforcing ribs 613*a* are provided in the recess 675*a*. The ribs 613*a* are provided at predetermined intervals in a longitudinal direction (an up-down direction in FIG. 10) of the bulging portion 675.

In the present embodiment, the bulging portion 675 is formed by recessing the bottom wall portion 613 toward the inside of the case 6, and thus a weight of the case 6 is not increased as compared with a case where the bottom wall portion 613 is not recessed and the bulging portion 675 is formed solid on an inner periphery of the bottom wall portion 613.

As illustrated in FIG. 9, in the bottom wall portion 613, bulging portions 674 and 676 are provided on both sides of the bulging portion 675 in the vehicle front-rear direction. The bulging portions 674 and 676 also extend linearly in the vehicle width direction in the region of the bottom wall portion 613. The bulging portions 674 and 676 extend linearly on the extension of the boss portions 614 and 616 (see FIG. 3) toward the joint portion 612.

As illustrated in FIG. 6, the bulging portions 674 and 676 are also formed by recessing the bottom wall portion 613 toward the inside of the case 6. In a cross-sectional view, the bulging portions 674 and 676 are formed in a substantially semicircular shape in which the vertices P and P are directed upward in the vertical line VL direction.

As illustrated in FIG. 9, a thick portion 610 is provided on the partition wall portion 62 side (an upper side in FIG. 9) between the bulging portion 675 and the bulging portion 676 to bulge toward the front side of the paper.

As illustrated in FIG. 6, the thick portion 610 is provided with a bolt hole 610*a*. The bolt hole 610*a* allows communication between the inside and the outside of the case 6. A metal plug PL is screwed into the bolt hole 610*a*, and an opening of the bolt hole 610*a* is sealed by the plug PL.

As illustrated in FIGS. 5 and 6, the strainer 10 is supported at two locations, that is, the mechanical oil pump MOP fixed to the partition wall portion 62 and the connection portion 625 provided in the partition wall portion 62.

As illustrated in FIG. 6, the strainer 10 allows the discharge passage 151 to communicate with the mechanical oil pump MOP by inserting a distal end 15*a* side of the first connection portion 15 into the connection port 120 on a mechanical oil pump MOP side.

Furthermore, as illustrated in FIG. 5, the strainer 10 allows the discharge passage 161 to communicate with the oil passage 626 on a case 6 side via the tubular member 130 inserted to span the connection portion 625 on a partition wall portion 62 side and the second connection portion 16.

As illustrated in FIG. 6, in the strainer 10 disposed in the case 6, the peripheral wall 13 is located between the bulging portion 674 and the bulging portion 675 on the bottom wall portion 613 side. In this state, in the strainer 10, the suction port 135 of the oil OL is opposed to an outer peripheral surface 675*b* of the bulging portion 675 on the vehicle front side.

In the peripheral wall 13, the distal end 132*a* of the second side plate portion 132 is located lower than the vertex P of the bulging portion 675 in the vertical line VL direction, and the distal end 131*a* of the first side plate portion 131 is located above the vertex P of the bulging portion 675 in the vertical line VL direction.

When viewed from the vehicle front side (a right side in FIG. 6), a distal end 132*a* side of the suction port 135 overlaps a region of the bulging portion 675 on the vertex P side. That is, the distal end 132*a* side of the suction port 135 and the vertex P side of the bulging portion 675 are provided to overlap each other over a region R1 in a predetermined height range.

When viewed from an upper side in the vertical line VL direction, the suction port 135 overlaps a region of the bulging portion 675 on the vehicle front side (see FIG. 11). That is, the suction port 135 and the vehicle front side of the bulging portion 675 are provided to overlap each other over a region R2 in a predetermined range (see FIG. 6).

As illustrated in FIG. 11, in the bottom wall portion 613, the plug PL is exposed in a region between the bulging portion 675 and the bulging portion 676. When viewed from the vertical line VL direction, the plug PL and the magnet 14A are disposed in a positional relation having an overlapping range.

In the power transmission device 1, when the mechanical oil pump MOP is driven, the oil OL stored in the accommodation portion 67 is sucked into the strainer 10 and then supplied to the mechanical oil pump MOP via the discharge passage 151 (see FIG. 6).

When the electric oil pump EOP is driven, the oil OL stored in the accommodation portion 67 is sucked into the strainer 10, and then supplied to the electric oil pump EOP via the discharge passage 161 and the oil passage 626 on the partition wall portion 62 side (see FIG. 5).

The oil OL sucked into the strainer 10 is the oil OL stored on the bottom wall portion 613 side of the lower portion of the case 6. Here, as illustrated in FIG. 6, the suction port 135 of the strainer 10 is disposed such that an opening thereof faces obliquely downward on the vehicle rear side.

Therefore, of the oil OL stored between the strainer 10 and the bottom wall portion 613, the oil OL stored on the vehicle rear side where the magnets 14 (14A, 14B) are located is more actively sucked into the strainer 10 from the suction port 135 than the oil OL stored on the vehicle front side.

When viewed from the upper side in the vertical line VL direction, the magnets 14 (14A, 14B) are located in a movement path of the oil OL from the vehicle rear side toward the suction port 135. Therefore, the oil OL that flows toward the suction port 135 reaches the suction port 135 through a range over which a magnetic force of the magnets 14 (14A, 14B) extends.

Here, the oil OL stored in the lower portion of the case 6 is oil OL used for lubrication and cooling of the power transmission mechanism, and contains contaminants (foreign matter) such as metal powder.

In the present embodiment, the oil OL passing through the vicinity of the magnets 14 is actively sucked into the strainer 10. Therefore, when the oil OL passes below the magnets 14, foreign matter such as metal powder contained in the oil OL is attracted by the magnetic force of the magnets 14 and is trapped by the magnets 14. Thus, the amount of foreign matter contained in the oil OL sucked into the strainer 10 from the suction port 135 can be reduced.

Here, the bulging portion 675 is located between a region where the magnets 14 (14A, 14B) are disposed and the suction port 135. A gap in the vertical line VL direction between the strainer 10 and the bottom wall portion 613 is narrowed at a portion of the bulging portion 675.

Accordingly, the flow of the oil OL sucked from the magnets 14 side is inhibited by the portion of the bulging portion 675 and becomes slower. In other words, the flow of the oil OL in a region on the magnets 14 (14A, 14B) side when viewed from the bulging portion 675 becomes slower, and as a result, the foreign matter contained in the oil OL is easily trapped by the magnets 14 (14A, 14B). Thus, the amount of foreign matter contained in the oil OL sucked into the strainer 10 can be further reduced.

In the magnets 14A, 14B, the magnet 14A faces the metal plug PL in the vertical line VL direction. Therefore, a flow of magnetic field lines circulating from the magnet 14A to the magnet 14A via the plug PL is formed. Therefore, the oil OL passing below the magnet 14A cannot reach the suction port 135 unless a plurality of magnetic field lines are cut off. Therefore, when foreign matter such as metal powder contained in the oil OL passes between the magnet 14A and the plug PL, more foreign matter is trapped on the magnets 14 side.

As described above, the power transmission device 1 for a vehicle according to the present embodiment has the following configuration.

(1) The power transmission device 1 includes:

a power transmission mechanism (the torque converter T/C, the forward/reverse switching mechanism 2, the variator 3, the speed reduction mechanism 4, the differential 5) that transmits a driving force from the engine ENG (a drive source) to the drive wheels WH, WH;

the housing HS (a case) that accommodates the power transmission mechanism;

the strainer 10 disposed to face the bottom wall portion 613 of the case 6 in the housing HS;

the suction port 135 of the oil OL provided at a portion of the strainer 10 facing the bottom wall portion 613; and the magnets 14 (14A, 14B) disposed between the bottom wall portion 613 and the strainer 10 in the housing HS (the case 6).

The magnets 14 (14A, 14B) and the suction port 135 are provided to be displaced from each other when viewed from the vertical line VL direction along the facing direction of the strainer 10 and the bottom wall portion 613.

The suction port 135 is provided with an opening facing the magnets 14 (14A, 14B) side.

With this configuration, of the oil OL stored in the lower portion of the housing HS, the oil OL stored in the region on the magnets 14 (14A, 14B) side when viewed from the suction port 135 passes through a region where the magnets 14 (14A, 14B) between the bottom wall portion 613 and the strainer 10 are disposed, and is sucked into the strainer 10 from the suction port 135.

Accordingly, magnetic materials (foreign matter) such as metal powder of foreign matter contained in the oil OL are trapped by the magnets 14 (14A, 14B). Thus, an amount of foreign matter contained in the oil OL sucked into the strainer 10 can be reduced.

(2) In a cross-sectional view, the straight line L (see FIG. 6) along the opening surface of the suction port 135 is inclined with respect to the vertical line VL.

The suction port 135 is disposed at a position where an end (the distal end 131*a*) on the magnets 14 (14A, 14B) side is farther away from the bottom wall portion 613 than an end (the distal end 132*a*) on an opposite side of the magnets 14 (14A, 14B) side.

With this configuration, the suction port 135 is provided with an opening facing the magnets 14 (14A, 14B) side. Accordingly, the oil OL in the region on the magnets 14 (14A, 14B) side is more likely to be sucked into the suction port 135 than the oil OL in the other region.

Since the oil OL in the region on the magnets 14 (14A, 14B) side is sucked more from the suction port 135, the amount of foreign matter contained in the oil OL sucked into the strainer 10 can be reduced.

In other words, in a cross-sectional view taken along a straight line (center line C1) connecting the magnets 14 (14A, 14B) and the suction port 135, that is, a cross-section when viewed from the facing direction (the vertical line VL) of the strainer 10 and the bottom wall portion 613, the suction port 135 is disposed at the position where the end (the distal end 131*a*) on the magnets 14 (14A, 14B) side is farther away from the bottom wall portion 613 than the end (the distal end 132*a*) on the opposite side of the magnets 14 (14A, 14B) side (see FIG. 6).

(3) The bottom wall portion 613 is provided with the bulging portion 675 bulging upward on the strainer 10 side.

When viewed from the vertical line VL direction, the bulging portion 675 is located between the magnets 14 (14A, 14B) and the suction port 135 (see FIG. 11).

With this configuration, a gap in the vertical line VL direction between the strainer 10 and the bottom wall portion 613 is narrowed by an amount corresponding to a portion (the region R1 in FIG. 6) overlapping the bulging portion 675 when viewed from the vehicle front-rear direction (see FIG. 6). Therefore, the flow of the oil OL from the magnets 14 (14A, 14B) side toward the suction port 135 is inhibited by the portion of the bulging portion 675 and becomes slower. In other words, the flow of the oil OL in the region on the magnets 14 (14A, 14B) side when viewed from the bulging portion 675 becomes slower, and as a result, the foreign matter contained in the oil OL is easily trapped by the magnets 14 (14A, 14B). Thus, the amount of foreign matter contained in the oil OL sucked into the strainer 10 can be reduced.

(4) The case 6 of the housing HS includes the boss portion 615 (see FIG. 3) at the joint portion 611 with the second cover 8 (another adjacent case).

The bulging portion 675 is located on the extension of the boss portion 615 when viewed from the rotation axis X direction of the power transmission device 1 (see FIG. 10).

With this configuration, in order to provide the bulging portion 675, a shape of a metal mold used for casting the case 6 is not complicated. Accordingly, the case 6 including the bulging portion 675 can be easily manufactured without inhibiting the formation of the case 6.

(5) The suction port 135 overlaps the bulging portion 675 in the vertical line VL direction along the facing direction of the strainer 10 and the bottom wall portion 613 (see FIG. 11).

With this configuration, when viewed from the strainer 10 side in the facing direction, the suction port 135 is disposed in a positional relation having a region R2 (see FIG. 6) where the suction port 135 overlaps the bulging portion 675. Therefore, a gap between the suction port 135 and the bottom wall portion 613 in the facing direction is narrowed by the bulging portion 675. Since the oil OL containing air is less likely to approach the suction port 135, it is possible to limit suction of the oil OL containing a large amount of air into the strainer 10.

(6) The suction port 135 opens obliquely downward toward the vehicle rear side with reference to the installation state of the power transmission device 1 on the vehicle.

The suction port 135 overlaps the bulging portion 675 in the vehicle front-rear direction.

With this configuration, when viewed from the vehicle front side, the suction port 135 is disposed in a positional relation having the region R1 where the suction port 135 overlaps the bulging portion 675 (see FIG. 6).

At the time of rapid acceleration or rapid deceleration of the vehicle, the oil OL stored in the housing HS tends to be unevenly distributed toward the vehicle rear side or the vehicle front side.

Therefore, when an opening of the suction port 135 faces the vehicle rear side, the suction port 135 opens on a downstream side in a moving direction of the oil OL when the vehicle suddenly decelerates. Thus, more oil OL can be taken into the strainer 10 from the suction port 135.

In particular, the suction port 135 is located on the vehicle front side when viewed from the bulging portion 675, and the bottom wall portion 613 side of the opening of the suction port 135 is hidden by the bulging portion 675 when viewed from the vehicle rear side. Therefore, the oil OL stored in the lower portion of the bottom wall portion 613 side cannot reach the suction port 135 without passing through a narrow gap between a lower portion of the strainer 10 and the bulging portion 675.

Accordingly, since the oil OL containing air is less likely to be sucked into the strainer 10, it is possible to suitably prevent the oil OL containing air from being sucked into the strainer 10 at the time of rapid deceleration of the vehicle.

(7) The recess 675a having an opening facing outward is disposed on an outer periphery of a region of the bottom wall portion 613 where the bulging portion 675 is provided.

With this configuration, the bulging portion 675 is formed by recessing the region of the bottom wall portion 613 into the case 6. When the bulging portion 675 is provided, it is not necessary to increase a thickness of the bottom wall portion 613.

Accordingly, since an increase in weight of the case 6 can be suitably prevented, an influence on the fuel efficiency of the vehicle on which the power transmission device 1 is mounted can be reduced.

(8) The case 6 includes the partition wall portion 62 that partitions a space in the case 6 into the first chamber S1 and the second chamber S2 that are adjacent to each other in a rotation axis direction of the power transmission device 1.

The partition wall portion 62 is provided with an opening portion 620 (communication hole) that allows communication between the first chamber S1 and the second chamber S2.

When viewed from the vertical line VL direction, the strainer 10 is disposed with a region where the strainer 10 overlaps the partition wall portion 62.

With this configuration, the first chamber S1 and the second chamber S2 communicate with each other via the opening portion 620 provided in the accommodation portion 67 at the lower portion of the case 6 (see FIG. 5). Therefore, the strainer 10 disposed in the accommodation portion 67 can suck both the oil OL stored in the lower portion of the first chamber S1 and the oil OL stored in the second chamber S2. Accordingly, since the oil OL smoothly returns to the accommodation portion 67, and the total amount of the oil OL stored in the case 6 can be reduced. Accordingly, since the friction to a rotation body constituting the power transmission mechanism can be reduced, improvement in fuel efficiency of the vehicle on which the power transmission device 1 is mounted can be expected.

(9) The strainer 10 is made of a resin material.

In the strainer 10, the protrusions 122, 122 that serve as attachment portions of the magnets 14 (14A, 14B) are integrally provided with a portion facing the bottom wall portion 613.

With this configuration, since the protrusions 122, 122 that serve as attachment portions of the strainer 10 and the magnets 14 (14A, 14B) can be made of the same resin material, a resin strainer including attachment portions of the magnets 14 (14A, 14B) can be easily manufactured. Accordingly, a strainer capable of trapping foreign matter can be easily manufactured.

Figure 12:
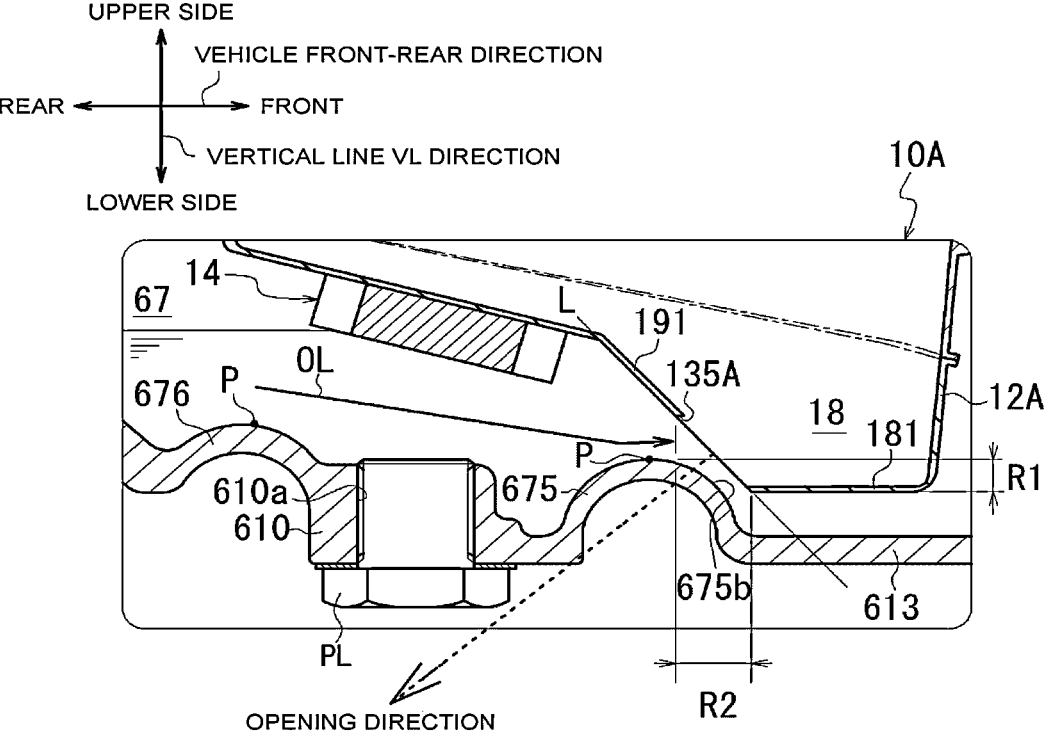
FIG. 12 is a diagram illustrating a strainer according to a modification.

FIG. 12 is a diagram illustrating a strainer 10A according to a modification.

In the strainer 10, a case where the suction port 135 of the oil OL is provided at a distal end of the peripheral wall 13 that protrudes toward the bottom wall portion 613 has been exemplified.

As illustrated in FIG. 12, when a lower case 12A of the strainer 10A includes a bulging region 18 that protrudes toward the bottom wall portion 613, an opening may be provided in an inclined portion 191 on the magnets 14 side in the bulging region 18, and the opening may be used as a suction port 135A of the oil OL.

In the vertical line VL direction, a bottom portion 181 of the bulging region 18 is located below the bulging portion 675 on the bottom wall portion 613 side. The inclined portion 191 is connected to an end of the bottom portion 181 on the vehicle rear side.

The inclined portion 191 of the strainer 10A is inclined so that a height position in the vertical line VL direction increases toward the magnets 14.

Therefore, in the strainer 10A, the suction port 135A is provided at a position where the suction port 135A overlaps the bulging portion 675 when viewed from the vehicle front side and overlaps a vehicle front side of the bulging portion 675 when viewed from a vehicle upper side.

Accordingly, when viewed from a strainer 10A side in the vertical line VL direction, the suction port 135A is disposed in a positional relation having the region R2 where the suction port 135A overlaps the bulging portion 675. Therefore, a gap between the suction port 135A and the bottom wall portion 613 in the facing direction is narrowed by the bulging portion 675. Since the oil OL containing air is less likely to approach the suction port 135A, it is possible to limit suction of the oil OL containing a large amount of air into the strainer 10A.

Further, when viewed from the vehicle front side, the suction port 135A is disposed in a positional relation having the region R1 where the suction port 135A overlaps the bulging portion 675.

Therefore, the suction port 135A opens on a downstream side in the moving direction of the oil OL when the vehicle suddenly decelerates, and more oil OL can be taken into the strainer 10A from the suction port 135A.

In the embodiment and the modification described above, a case where the magnets 14 (14A, 14B) are attached to the strainers 10, 10A has been exemplified. Alternatively, the magnets 14 (14A, 14B) may be provided on the bottom wall portion 613 side.

In the above-described embodiment, the first side plate portion 131 and the second side plate portion 132 of the peripheral wall 13 are respectively inclined at predetermined intersection angles θ131 and θ132 with respect to the vertical line VL.

A shape of the peripheral wall 13 that forms the suction port 135 of the strainer 10 is not limited to this aspect. The arrangement (the intersection angles θ131 and θ132) of the first side plate portion 131 and the second side plate portion 132 of the peripheral wall 13 can be appropriately changed within a range in which the straight line L along the opening surface of the suction port 135 intersects the vertical line VL with an inclination as illustrated in FIG. 6.

For example, the intersection angles θ131 and θ132 may be set to an angle close to zero (=0). In this case, by making a length of the first side plate portion 131 in the vertical line VL direction shorter than a length of the second side plate portion 132 in the vertical line VL direction, the straight line L along the opening surface of the suction port 135 can be inclined with respect to the vertical line VL.

With such a configuration, the same effects as those of the above-described embodiment are obtained.

The present invention can also be regarded as a hydraulic control device.

(10) The hydraulic control device includes:

the strainer 10 disposed to face the bottom wall portion 613 in the housing HS (a case); and the magnets 14 (14A, 14B) disposed between the bottom wall portion 613 and the strainer 10 in the housing HS.

An oil pump (the electric oil pump EOP, the mechanical oil pump MOP) that sucks the oil OL stored in a lower portion of the housing HS via the strainer 10 is provided.

The strainer 10 includes the suction port 135 of the oil OL in a portion facing the bottom wall portion 613.

The suction port 135 is provided with an opening facing the magnets 14 (14A, 14B) side.

In the hydraulic control device having such a configuration, an amount of foreign matter contained in the oil OL sucked into the strainer 10 can also be reduced. The hydraulic control device is not limited only to the application to the power transmission device 1. The present invention is applicable to various hydraulic control devices including a mechanism that sucks the oil OL via a strainer.

In the above-described embodiment, a case where the power transmission device 1 transmits rotation of the engine ENG to the drive wheels WH, WH has been exemplified. Alternatively, the power transmission device 1 may transmit rotation of at least one of the engine ENG or a motor (a rotary electric machine) to the drive wheels WH, WH. For example, one motor or two clutch type power transmission device (a form in which a motor is disposed between the engine ENG and the power transmission device, a first clutch is disposed between the engine ENG and the motor, and a second clutch is disposed in the power transmission device 1) may be used.

In the above-described embodiment, a case where the power transmission device 1 has a transmission function has been exemplified. Alternatively, the power transmission mechanism may simply decelerate (may be accelerated) without having the transmission function. In a case where the power transmission device does not have the transmission function and the power transmission device is configured to decelerate the rotation of the motor and transmit the rotation to the drive wheels WH, WH, a hydraulic control circuit for supplying the oil OL for cooling the motor and the oil OL for lubrication of a speed reduction mechanism is disposed in the second chamber S2 together with the electric oil pump EOP. Further, in the above-described embodiment, a case where a control unit of the power transmission device 1 includes the control valve CV has been exemplified. Alternatively, when the power transmission device 1 does not have a transmission mechanism and the drive source is not the engine ENG but a motor (rotary electric), a control unit including an inverter or the like that drives and controls the motor may be used.

Although the embodiments of the present invention have been described above, the present invention is not limited to the aspects shown in the embodiments. Various modifications can be made within the scope of the technical idea of the present invention.

The present application claims a priority of Japanese Patent Application No. 2022-047607 filed with the Japan Patent Office on Mar. 23, 2022, all the contents of which are hereby incorporated by reference.

DESCRIPTION OF REFERENCE SIGNS

1 power transmission device
2 forward/reverse switching mechanism (power transmission mechanism)
3 variator (power transmission mechanism)
4 speed reduction mechanism (power transmission mechanism)
5 differential (power transmission mechanism)
6 case
613 bottom wall portion
615 boss portion
61 partition wall portion
620 opening portion (communication hole)
675 bulging portion
675a recess
8 second cover portion (adjacent case)
10 strainer
122 protrusion (attachment portion of magnet)
135 suction port for oil
14 (14A, 14B) magnet
HS housing (case)
S1 first chamber
S2 second chamber
T/C torque converter (power transmission mechanism)

The invention claimed is:

1. A power transmission device comprising:

a case configured to accommodate a power transmission mechanism;

a strainer disposed to face a bottom wall portion in the case;

a suction port for oil provided in a portion of the strainer facing the bottom wall portion; and a magnet disposed between the bottom wall portion and the strainer in the case, wherein the magnet and the suction port are provided to be displaced from each other when viewed from a facing direction of the strainer and the bottom wall portion, the suction port is provided with an opening facing a magnet side, the bottom wall portion is provided with a bulging portion bulging towards the strainer, and the bulging portion is located between the magnet and the suction port when viewed from the facing direction.

2. The power transmission device according to claim 1, wherein in a cross-sectional view, an opening surface of the suction port is inclined with respect to a vertical line, and an end of the suction port on the magnet side is disposed at a position farther away from the bottom wall portion than an end on an opposite side is.

3. The power transmission device according to claim 1, wherein the case includes a boss portion at a joint portion with another adjacent case, and the bulging portion is located on an extension of the boss portion when viewed from a rotation axis direction of the power transmission device.

4. The power transmission device according to claim 1, wherein the suction port overlaps the bulging portion in the facing direction.

5. The power transmission device according to claim 1, wherein the suction port opens toward a vehicle rear side with reference to an installation state of the power transmission device on a vehicle, and the suction port overlaps the bulging portion in a front-rear direction of the vehicle.

6. The power transmission device according to claim 1, wherein a recess having an opening facing outward is disposed on an outer periphery of a region of the bottom wall portion where the bulging portion is provided.

7. The power transmission device according to claim 1, wherein the case includes a partition wall portion that partitions a space in the case into a first chamber and a second chamber that are adjacent to each other in a rotation axis direction of the power transmission device, and the partition wall portion is provided with a communication hole that allows communication between the first chamber and the second chamber, and the strainer overlaps the partition wall portion in the facing direction.

8. The power transmission device according to claim 1, wherein the strainer is made of a resin material, and in the strainer, an attachment portion of the magnet is integrally provided with the portion facing the bottom wall portion.

9. A hydraulic device comprising:

a strainer disposed to face a bottom wall portion in a case;

a magnet disposed between the bottom wall portion and the strainer in the case; and an oil pump configured to suck oil stored in a lower portion of the case via the strainer, wherein the strainer includes a suction port for the oil at a portion facing the bottom wall portion, the magnet and the suction port are provided to be displaced from each other when viewed from a facing direction of the strainer and the bottom wall portion, the suction port is provided with an opening facing a magnet side, the bottom wall portion is provided with a bulging portion bulging towards the strainer, and the bulging portion is located between the magnet and the suction port when viewed from the facing direction.

\* \* \* \* \*